United States Patent
Liu et al.

(10) Patent No.: US 12,358,477 B2
(45) Date of Patent: Jul. 15, 2025

(54) AUTOMOBILE ELECTRONIC PARKING EXECUTION CONTROLLER WITH DOUBLE-MCU REDUNDANCY DESIGN

(71) Applicant: GLOBAL TECHNOLOGY CO., LTD., Nantong (CN)

(72) Inventors: Zhaoyong Liu, Nantong (CN); Yiping Chen, Nantong (CN); Qindong Gu, Nantong (CN)

(73) Assignee: GLOBAL TECHNOLOGY CO., LTD., Nantong (CN)

( * ) Notice: Subject to any disclaimer, the term of this patent is extended or adjusted under 35 U.S.C. 154(b) by 193 days.

(21) Appl. No.: 18/012,652

(22) PCT Filed: Aug. 5, 2021

(86) PCT No.: PCT/CN2021/110816
§ 371 (c)(1),
(2) Date: Dec. 23, 2022

(87) PCT Pub. No.: WO2022/028520
PCT Pub. Date: Feb. 10, 2022

(65) Prior Publication Data
US 2023/0249656 A1 Aug. 10, 2023

(30) Foreign Application Priority Data

Aug. 7, 2020 (CN) .......................... 202010787348.5

(51) Int. Cl.
*B60T 8/88* (2006.01)
*B60T 8/92* (2006.01)
(Continued)

(52) U.S. Cl.
CPC ................ *B60T 8/885* (2013.01); *B60T 8/92* (2013.01); *B60T 13/74* (2013.01); *B60T 17/22* (2013.01);
(Continued)

(58) Field of Classification Search
CPC .. B60T 15/041; B60T 15/048; B60T 2201/00; B60T 8/885; H02P 23/14
See application file for complete search history.

(56) References Cited

U.S. PATENT DOCUMENTS 7,525,271 B2 * 4/2009 Chen .................... H02P 6/16
318/434
2006/0273656 A1 12/2006 Sherman et al.

FOREIGN PATENT DOCUMENTS

CN 102371997 A 3/2012
CN 103167976 A 6/2013
(Continued)

*Primary Examiner* — Said Bouziane
(74) *Attorney, Agent, or Firm* — Bayramoglu Law Offices LLC

(57) ABSTRACT

An automobile electronic parking execution controller with a double-MCU redundancy design comprises a parking switch circuit, a biaxial acceleration sensor unit, a main micro control unit (MCU) U2 and a monitoring MCU U1, wherein the main MCU U2 controls a parking motor by means of detecting signals of the parking switch circuit and the biaxial acceleration sensor, the monitoring MCU U1 monitors a running state of a whole control system and restores the main MCU U2 when the main MCU U2 is abnormal, and the main MCU U2 restores the monitoring MCU U1 when the monitoring MCU U1 is abnormal. After the main MCU U2 crashes, the main MCU U2 can still be quickly stored through the monitoring MCU U1, so that the main MCU U2 quickly enters a response state to recover the parking brake control ability, which improves the safety of the system.

5 Claims, 6 Drawing Sheets

(51) Int. Cl.
  *B60T 13/74* (2006.01)
  *B60T 17/22* (2006.01)
  *H02P 23/14* (2006.01)
(52) U.S. Cl.
  CPC ........... *H02P 23/14* (2013.01); *B60T 2250/00* (2013.01); *B60T 2270/402* (2013.01); *B60T 2270/413* (2013.01)

(56) References Cited

FOREIGN PATENT DOCUMENTS

| | | | |
|---|---|---|---|
| CN | 104192118 | A * | 12/2014 |
| CN | 106154894 | A | 11/2016 |
| CN | 206049408 | U | 3/2017 |
| CN | 206922676 | U | 1/2018 |
| CN | 207257563 | U | 4/2018 |
| CN | 108639038 | A | 10/2018 |
| CN | 111169471 | A | 5/2020 |
| CN | 210578326 | U | 5/2020 |
| CN | 211075855 | U | 7/2020 |
| CN | 111907505 | A | 11/2020 |
| DE | 102016006810 | A1 | 2/2017 |
| DE | 102017209314 | A1 | 12/2018 |
| KR | 20130019465 | A | 2/2013 |
| KR | 20140017830 | A | 2/2014 |
| KR | 102029723 | B1 | 10/2019 |
| WO | 9702156 | A1 | 1/1997 |

\* cited by examiner

FIG. 3D

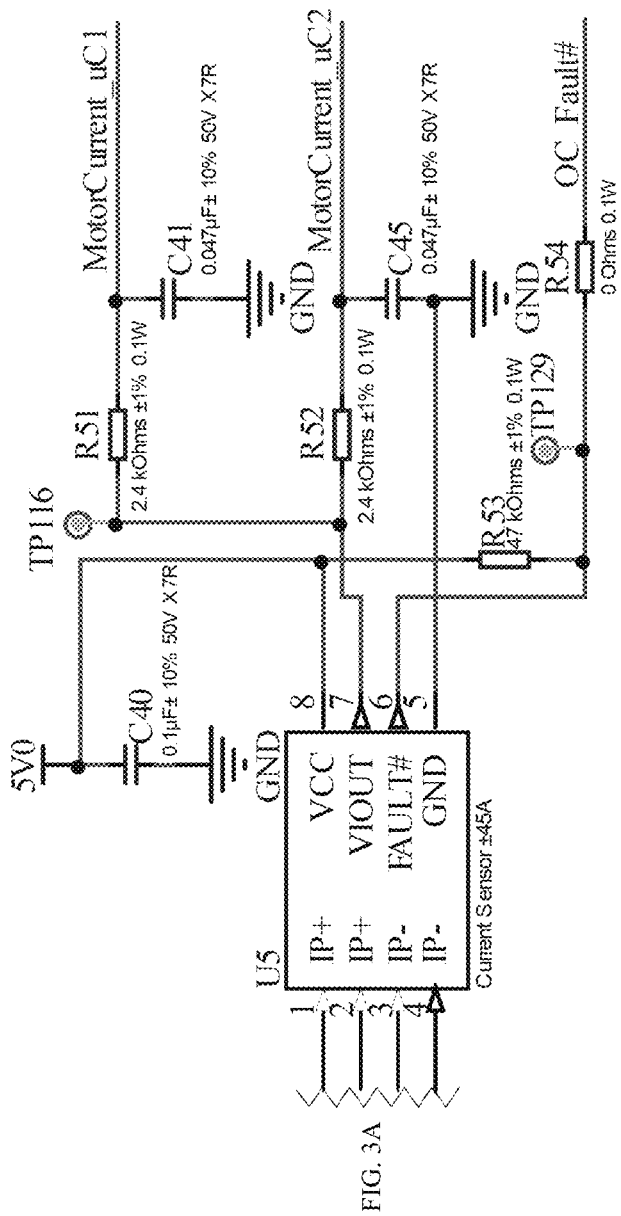

AUTOMOBILE ELECTRONIC PARKING EXECUTION CONTROLLER WITH DOUBLE-MCU REDUNDANCY DESIGN

CROSS REFERENCES OF THE RELATED APPLICATIONS

The application is the national phase entry of International Application No. PCT/CN2021/110816, filed on Aug. 5, 2021, which claims priority based on Chinese patent application No. 202010787348.5 filed on Aug. 7, 2020, the entire contents of which are incorporated herein by reference.

TECHNICAL FIELD

The present invention relates to the technical field of electrical automobile control, and in particular to an automobile electronic parking execution controller with a double-micro control unit (MCU) redundancy design.

BACKGROUND

An automobile electronic parking brake control system is mainly composed of a microcontroller, an IO processing circuit, an H-bridge drive circuit, a parking switch circuit and a biaxial acceleration sensor. The microcontroller and the H-bridge drive circuit form a core module of the electronic parking brake system. In the automobile electronic parking brake system, since a single MCU is used as a mainstream control device, there are certain crash fault and failure risks, which may affect the safety of an automobile parking brake.

SUMMARY

The present invention aims to provide an automobile electronic parking execution controller with a double-MCU redundancy design, where one more monitoring MCU U1 is introduced. After a main MCU U2 crashes, the main MCU U2 can still be quickly restored through the monitoring MCU U1, so that the main MCU U2 quickly enters a response state to recover its parking brake control ability, which greatly improves the safety of a system and makes the whole system more reliable in application.

The technical purpose of the present invention is realized by the following technical solution:

Provided is an automobile electronic parking execution controller with a double-MCU redundancy design, which comprises a parking switch circuit, a biaxial acceleration sensor unit, a main micro control unit (MCU) U2 and a monitoring MCU U1, wherein the main MCU U2 controls a parking motor by means of detecting signals of the parking switch circuit and the biaxial acceleration sensor;

the monitoring MCU U1 monitors a running state of a whole control system, and restores the main MCU U2 when the main MCU U2 is abnormal.

Even further, two ends of the motor respectively control connection directions of a positive pole and a negative pole of the motor through a single-pole double-throw relay RL1 so as to control a clockwise or anticlockwise rotation of the motor.

Even further, the motor is driven by a pulse width modulation (PWM) switch through an MOS power switch to regulate a rotation speed and torque of the motor.

Even further, in the monitoring MCU U1,
a pin 3 is connected to a 5V power supply and a capacitor C98, and a pin 4 is connected to the other end of the capacitor C98 and grounded;
a pin 6 is connected to a gate of a motor drive circuit MOS switch Q12 and sends a motor drive control signal;
the pin 9 is connected to the Hall sensor U5 used for measuring a working current of the motor, and is used for determining whether the motor is in a normal working state; if the current is overloaded, a signal is sent out through the pin 6 to control the running of the motor.

Even further, in the main MCU U2,
a pin 84 is connected to a 5V power supply and a capacitor C101, and a pin 83 is connected to the other end of the capacitor C101 and grounded;
pins 12 and 13 are connected to the two paths of single-pole double-throw relays RL1 to control the clockwise and anticlockwise rotations of the motor;
a pin 10 is connected to a gate of a motor drive MOS switch Q11;
pins 43 and 95 are connected to the Hall sensor U5.

Even further, the pin 6 of the monitoring MCU U1 is connected to a resistor R74, and the other end of the resistor R74 is connected to a resistor R75 and the gate of the MOS switch Q12; the other end of the resistor R75 and a source of the MOS switch Q12 are grounded; a drain of the MOS switch Q12 is connected to a drain of the MOS switch Q11, a negative pole of a diode D20, a base of a triode Q9 and a resistor R69; the other end of the resistor R69 is connected to a 13V power supply;
a source of the MOS switch Q11 is grounded; the gate is connected to a resistor R72; the other end of the resistor R72 is connected to a resistor R70 and the pin 10 of the main MCU U2, and the other end of the resistor R70 is connected to the 5V power supply;
a collector of the triode Q9 is connected to a resistor R68, and the other end of the resistor R68 is connected to the 13V power supply; an emitter of Q9 is connected to a positive pole of the diode D20 and a resistor R71; the other end of the resistor R71 is connected to a capacitor C65, a resistor R73, a negative pole of a voltage-stabilizing diode D21 and a gate of an MOS switch Q10, and the other ends of the capacitor C65, the resistor R73 and the voltage-stabilizing diode D21 and a source of the MOS switch Q10 are grounded;
a drain of the MOS switch Q10 is connected to positive poles of a diode D14 and a diode D15 and pins 1 of the two paths of single-pole double-throw relays RL1; pins 2 of the two paths of single-pole double-throw relays RL1 are connected to the 13V power supply; pins 3 of the two paths of single-pole double-throw relays RL1 are connected to a positive pole of a diode D16 and a drain of an MOS switch Q7; a gate of the MOS switch Q7 is connected to a resistor R55 and a resistor R56; the other end of the resistor R55 is connected to the pin 13 of the main MCU U2; the other end of the resistor R56 and a source of the MOS switch Q7 are grounded;
pins 4 of the two paths of single-pole double-throw relays RL1 are connected to a negative pole of D16, pins 6 of the two paths of single-pole double-throw relays RL1, a negative pole of a diode D10 and the 13V power supply; pins 5 of the two paths of single-pole double-throw relays RL1 are connected to a positive pole of the diode D10 and a drain of an MOS switch Q6; a gate of the MOS switch Q6 is connected to a resistor R49 and a resistor R50; the other end of the resistor R49 is connected to the pin 12 of the main MCU U2; the other end of the resistor R50 and a source of Q6 are grounded;

pins 7 of the two paths of single-pole double-throw relays RL1 are connected to an end B of a brush direct current (DC) motor, a negative pole of D14 and capacitors C38, C39 and C47, and the other end of the capacitor C47 is grounded; an end A of the DC motor is connected to the other ends of the capacitors C38 and C39 and pins 1 and 2 of the Hall sensor U5; pins 8 of the two paths of single-pole double-throw relays RL1 are connected to a negative pole of the diode D15, a capacitor C48, and pins 3 and 4 of the Hall sensor U5; the other end of the capacitor C48 is grounded;

a pin 5 of the Hall sensor U5 is grounded, and a pin 6 of the Hall sensor U5 is connected to a resistor R54; the other end of the resistor R54 is connected to the pin 95 of the main MCU U2; a pin 7 of the Hall sensor U5 is connected to a resistor R51 and a resistor R52; the other end of the resistor R51 is connected to the pin 43 of the main MCU U2 and a capacitor C41, and the other end of the capacitor C41 is grounded; the other end of the resistor R52 is connected to the pin 9 of the monitoring MCU U1 and a capacitor C45, and the other end of the capacitor C45 is connected to the pin 5 of U5; a pin 8 of the Hall sensor U5 is connected to a resistor R53, the 5V power supply and a capacitor C40; the other end of the resistor R53 is connected to the pin 6 of the Hall sensor U5; and the other end of the capacitor C40 is grounded.

Even further, in the monitoring MCU U1, pins 1 and 2 are respectively used for restoration inputting and program downloading signal connection of the monitoring MCU U1;

a pin 7 is connected to a pin 96 of the main MCU U2, and the main MCU U2 sends an enable chip select signal to the monitoring MCU U1 to enable the monitoring MCU U1;

pins 8, 13 and 14 input and output serial peripheral interface (SPI) signals and are connected to SPI memories, and pins 91, 92 and 93 of the main MCU U2 are connected to SPI sensors; the SPI signals are used for monitoring whether the main MCU U2 on an SPI bus makes an error in reading and writing an internal memory chip; if an error occurs, the main MCU U2 is restored according to a corresponding control logic;

a pin 10 is connected to a tension sensor and used for determining whether a load driven by the motor is in a normal working state; in case of an overload, the pin 6 sends a signal to control the running of the motor so as to control a tension load;

a pin 11 is used for restoration outputting to restore the main MCU U2;

pins 15 and 16 are respectively connected to pins 71 and 72 of the main MCU U2 and are used for communication and interaction between the main MCU U2 and the monitoring MCU U1;

pins 17, 18, 19 and 20 are used for inputting parking switch signals; after a combination state is converted by an analog-to-digital converter (AD) inside the monitoring MCU U1, the monitoring MCU U1 determines whether a user initiates a clamping or releasing action according to a preset logic, and then controls the clockwise and anticlockwise rotations of the motor to drive the tension load.

Even further, the main MCU U2 restores the monitoring MCU U1 when the monitoring MCU U1 is abnormal.

In conclusion, the present invention has the following beneficial effects:

1. By means of introducing one more monitoring MCU U1, after a main MCU U2 crashes, the main MCU U2 can still be quickly restored through the monitoring MCU U1, so that the main MCU U2 quickly enters a response state to recover its parking brake control ability, which greatly improves the safety of a system and makes the whole system more reliable in application.

2. A high-power H-bridge drive circuit has higher cost, and a relay DC motor drive unit adopts two paths of single-pole double-throw (SPDT) relays to control the clockwise and anticlockwise rotations of the motor, and adopts an MOS power switch to carry out PWM switch driving, so as to regulate the rotation speed and the torque. The relay DC motor drive unit is an excellent scheme for replacing the H-bridge drive circuit, and the low cost and reliable running are the technical core.

BRIEF DESCRIPTION OF THE DRAWINGS

FIG. 3A-3E is a motor MOS drive connection circuit.

DETAILED DESCRIPTION OF THE EMBODIMENTS

The detailed description of the present invention is further illustrated below with reference to the accompanying drawings, to which, however, the present invention is not limited.

Figure 1:
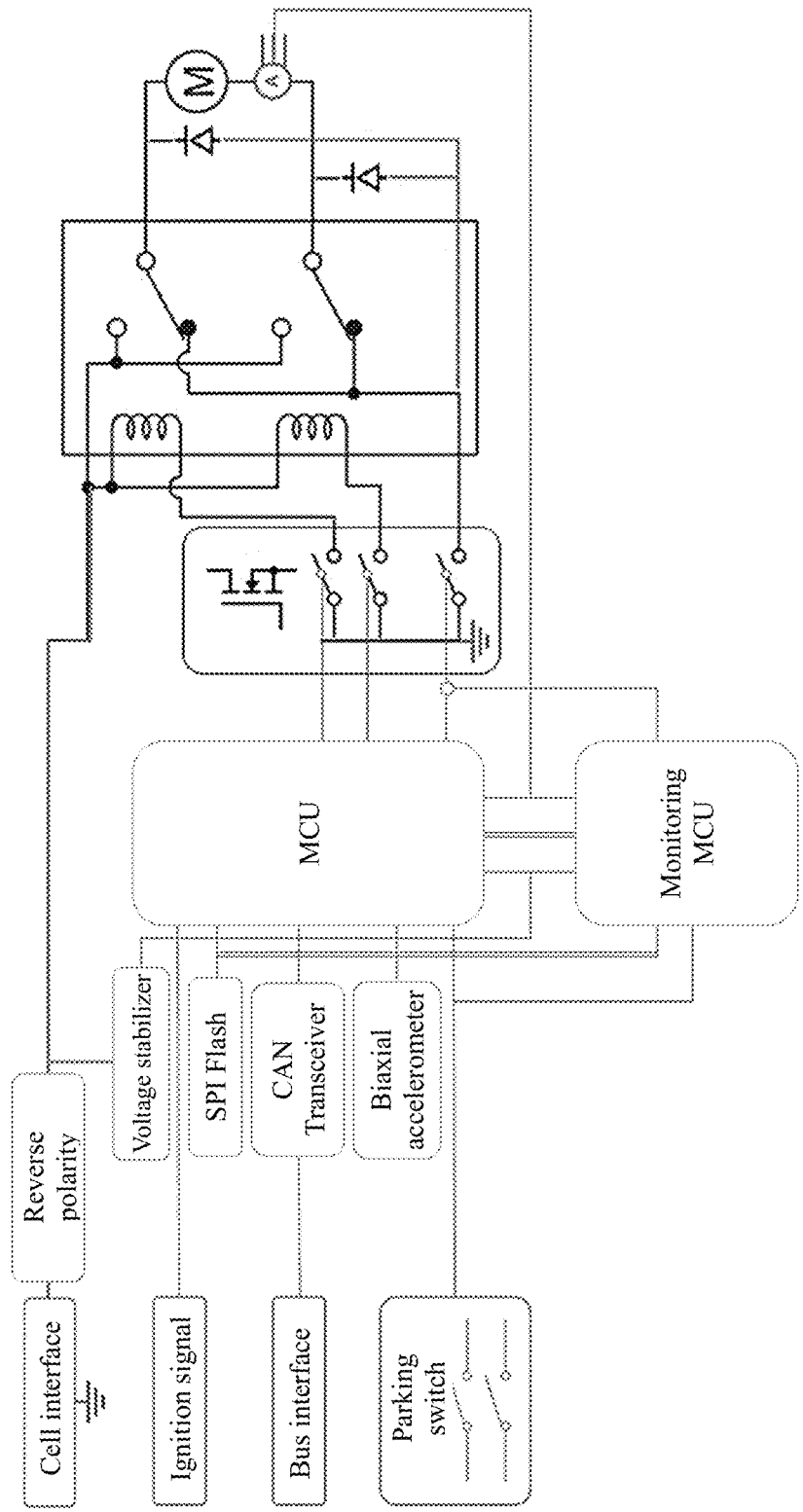
FIG. 1 is a schematic diagram of connection of an overall system of the present invention.

As shown in FIG. 1, provided is an automobile electronic parking execution controller with a double-MCU redundancy design, which comprises a parking switch circuit, a biaxial acceleration sensor unit, a main MCU U2 and a monitoring MCU U1. The main MCU U2 controls a parking motor by means of detecting signals of the parking switch circuit and the biaxial acceleration sensor. Controlling the parking motor through the parking switch circuit, the biaxial acceleration sensor unit and the single MCU is the prior art, which will not be excessively described here.

A double-MCU redundancy design control logic is added while keeping an original circuit connection. Specifically, the monitoring MCU U1 monitors a running state of a whole control system, and restores the main MCU U2 when the main MCU U2 is abnormal. The main MCU U2 restores the monitoring MCU U1 when the monitoring MCU U1 is abnormal.

As shown in FIG. 2 and FIG. 3A-3E, the parking motor is a DC motor which is driven by a PWM switch through an MOS power switch to regulate a rotation speed and torque of the motor. In order to reduce the cost risk, two ends of the motor control connection directions of a positive pole and a negative pole of the motor respectively through a single-pole double-throw (SPDT) relay RL1, so that the connections of the positive pole and the negative pole at the two ends of the motor are exchanged by the two paths of single-pole double-throw relays RL1 to control a clockwise or anticlockwise rotation of the motor. The relay DC motor drive unit is an excellent architecture for replacing the H-bridge drive circuit, and has low cost and reliable running.

Figure 2:
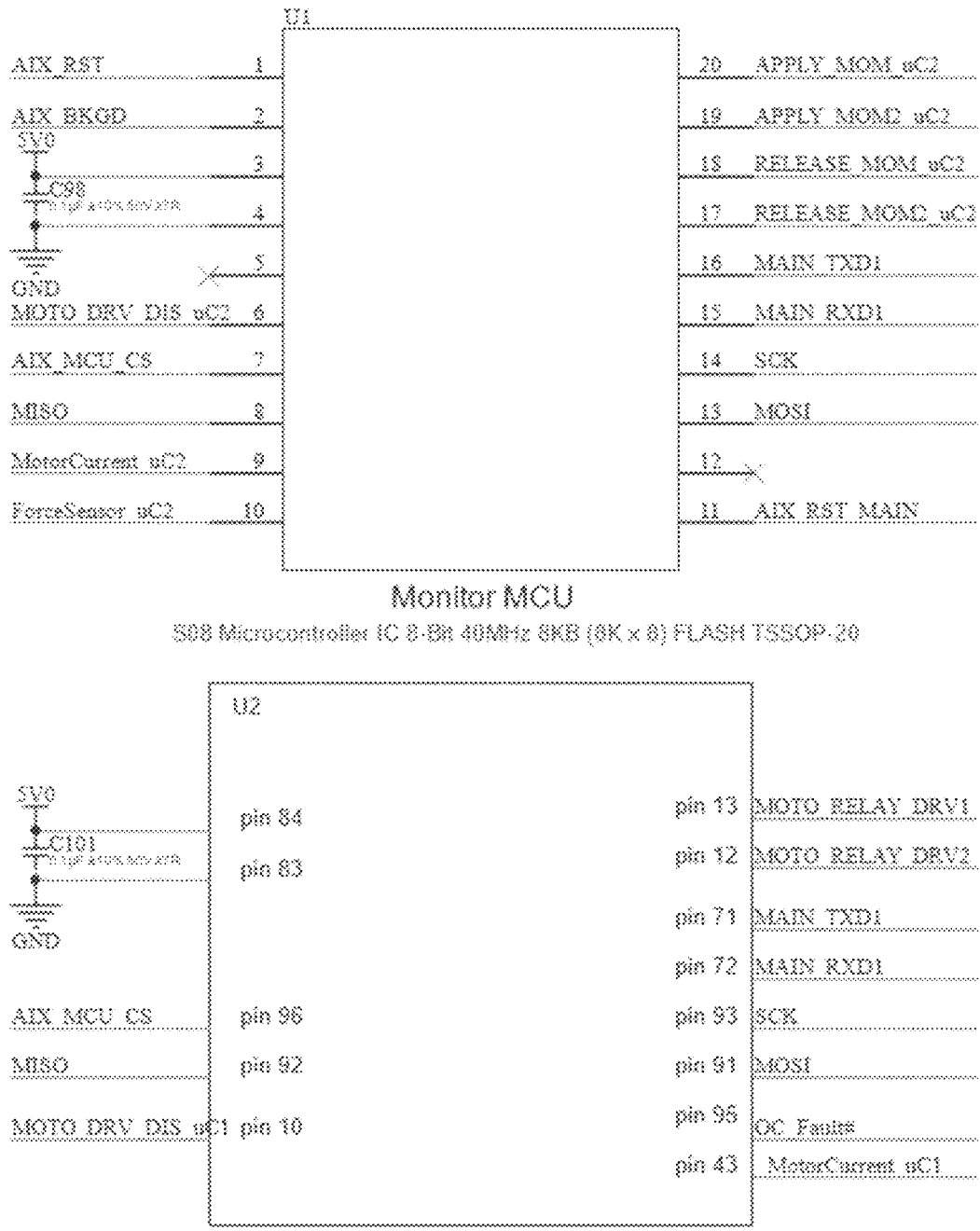
FIG. 2 is a signal connection diagram of a main MCU U2 and a monitoring MCU U1 in a double-MCU redundancy design architecture.
Figure 3A:
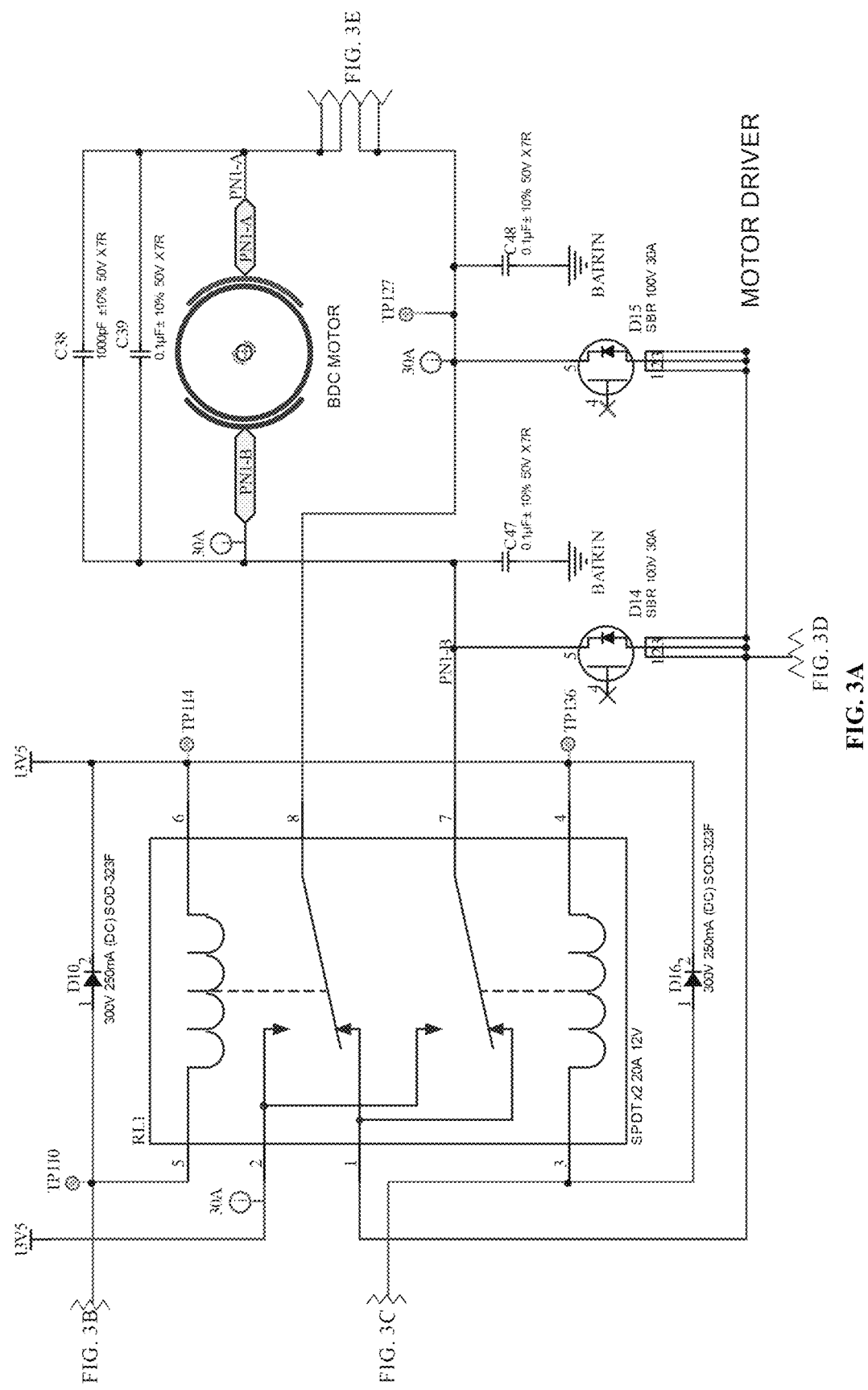
Figure 3B:
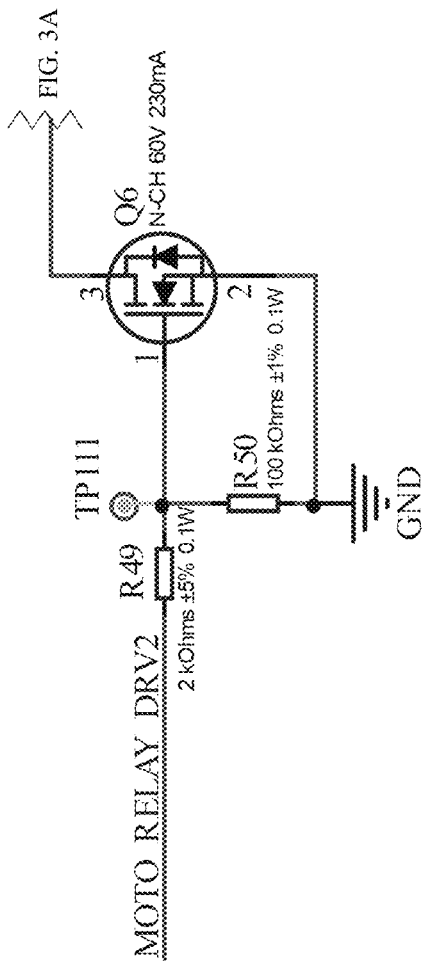
Figure 3C:
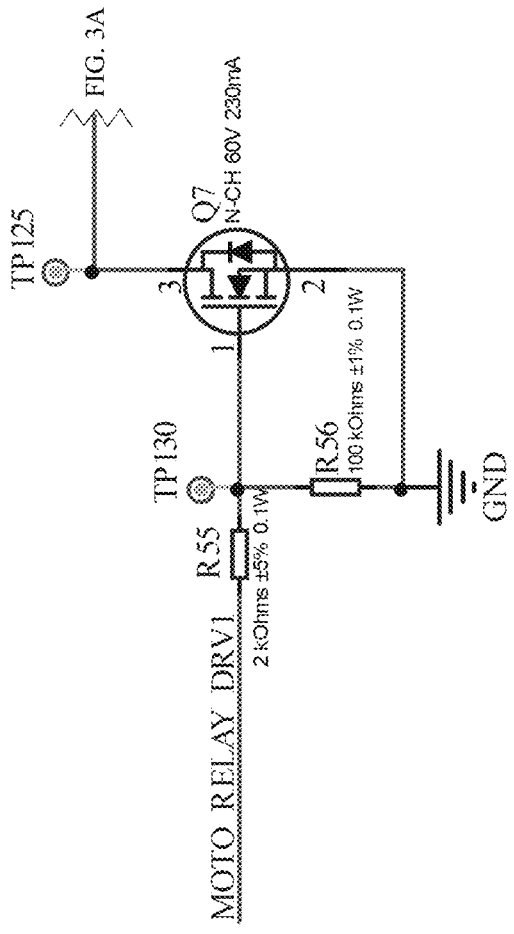

As shown in FIG. 2, the monitoring MCU U1 is U1, and the main MCU U2 is U2.

In the monitoring MCU U1, pins 1 and 2 are respectively used for restoration inputting and program downloading signal connection of the monitoring MCU U1.

Pins 3 and 4 are used for working power supply inputting connection. the pin 3 is connected to a 5V power supply and a capacitor C98, and the pin 4 is connected to the other end of the capacitor C98 and grounded.

Pins 5 and 12 are not used.

A pin 6 is connected to a gate of a motor drive circuit switch MOS and sends a motor drive control signal.

A pin 7 is connected to a pin 96 of the main MCU U2, and the main MCU U2 sends an enable chip select signal to U1 to enable U1.

Pins 8, 13 and 14 input and output SPI signals and are connected to SPI memories (MISO, MOSI, SCK), and pins 91, 92 and 93 of the main MCU U2 are connected to SPI sensors (MOSI, MISO, SCK). The SPI signals are used for monitoring whether the main MCU U2 on an SPI bus makes an error in reading and writing an internal memory chip; and if an error occurs, the main MCU U2 is restored according to a corresponding control logic.

A pin 9 is connected to a Hall sensor U5 used for measuring a working current of the motor, and the monitoring MCU unit U1 is used for determining whether the motor is in a normal working state. If the current is overloaded, a signal is sent out through the pin 6 to control the running of the motor.

A pin 10 is connected to a tension sensor and used for determining whether a load driven by the motor is in a normal working state. In case of an overload, the pin 6 sends a signal to control the running of the motor so as to control a tension load.

A pin 11 is used for restoration outputting to restore the main MCU U2 according to a predetermined algorithm. How to restore the MCU is the prior art, which will not be excessively described here.

Pins 15 and 16 are respectively connected to pins 71 and 72 of the main MCU U2, and communication and interaction between the main MCU U2 and the monitoring MCU U1 are achieved through a UART signal, which is a data exchange channel for completing active-standby switching between the main MCU U2 and the monitoring MCU U1.

When the main MCU U2 accesses relevant states of the monitoring MCU U1 through a UART bus and the monitoring MCU U1 cannot respond correctly in a corresponding time period, it is determined that the monitoring MCU U1 is abnormal. The main MCU U2 restores the monitoring MCU U1. For example, the main MCU U2 sends a segment of pseudo-random code, and the monitoring MCU U1 calculates its cyclic redundancy check (CRC) and returns it to the main MCU U2. The main MCU U2 calculates a verification result according to the CRC. If the result is consistent, it indicates that the monitoring MCU U1 is normal, otherwise, it indicates that the monitoring MCU U1 is abnormal.

Pins 17, 18, 19 and 20 are used for inputting parking switch input signals, and converting the four parking switch input signals into analog voltage signals within 5 V through a resistor-capacitor network, so that collection and state determination of an MCU AD converter are facilitated. After a combination state is converted by the AD inside the monitoring MCU U1, the monitoring MCU U1 determines whether a user initiates a clamping or releasing action according to a preset logic, and then controls the clockwise and anticlockwise rotations of the motor to drive the tension load.

As shown in FIG. 2, in the main MCU U2, pins 83 and 84 are used for working power supply inputting connection. A pin 84 is connected to a 5V power supply and a capacitor C101, and a pin 83 is connected to the other end of the capacitor C101 and grounded;

pins 12 and 13 are connected to the two paths of single-pole double-throw relays RL1 to control the clockwise and anticlockwise rotations of the motor;

a pin 10 is connected to a gate of a motor drive circuit MOS switch Q11 and is used for driving Q11 to be turned on or turned off, so as to drive a high-power MOSFET Q10 of a rear electrode to be turned on or turned off to power on or power off the motor.

Pins 43 and 95 are connected to the Hall sensor U5. A pin 43 is used for inputting a motor working current detection signal, and a pin 95 is used for inputting overcurrent and overload signals when the motor works.

As shown in FIG. 3A-3E, specifically, the pin 6 of the monitoring MCU U1 is connected to a resistor R74, and the other end of the resistor R74 is connected to a resistor R75 and the gate of the MOS switch Q12; the other end of the resistor R75 and a source of the MOS switch Q12 are grounded; a drain of the MOS switch Q12 is connected to a drain of the MOS switch Q11, a negative pole of a diode D20, a base of a triode Q9 and a resistor R69; the other end of the resistor R69 is connected to a 13V power supply;

a source of the MOS switch Q11 is grounded; the gate is connected to a resistor R72; the other end of the resistor R72 is connected to a resistor R70 and the pin 10 of the main MCU U2, and the other end of the resistor R70 is connected to the 5V power supply;

a collector of the triode Q9 is connected to a resistor R68, and the other end of the resistor R68 is connected to the 13V power supply; an emitter of Q9 is connected to a positive pole of the diode D20 and a resistor R71; the other end of the resistor R71 is connected to a capacitor C65, a resistor R73, a negative pole of a voltage-stabilizing diode D21 and a gate of an MOS switch Q10, and the other ends of the capacitor C65, the resistor R73 and the voltage-stabilizing diode D21 and a source of the MOS switch Q10 are grounded;

a drain of the MOS switch Q10 is connected to positive poles of a diode D14 and a diode D15 and pins 1 of the two paths of single-pole double-throw relays RL1; pins 2 of the two paths of single-pole double-throw relays RL1 are connected to the 13V power supply; pins 3 of the two paths of single-pole double-throw relays RL1 are connected to a positive pole of a diode D16 and a drain of an MOS switch Q7; a gate of the MOS switch Q7 is connected to a resistor R55 and a resistor R56; the other end of the resistor R55 is connected to the pin 13 of the main MCU U2; the other end of the resistor R56 and a source of the MOS switch Q7 are grounded;

pins 4 of the two paths of single-pole double-throw relays RL1 are connected to a negative pole of D16, pins 6 of the two paths of single-pole double-throw relays RL1, a negative pole of a diode D10 and the 13V power supply; pins 5 of the two paths of single-pole double-throw relays RL1 are connected to a positive pole of the diode D10 and a drain of an MOS switch Q6; a gate of the MOS switch Q6 is connected to a resistor R49 and a resistor R50; the other end of the resistor R49 is connected to the pin 12 of the main MCU U2; the other end of the resistor R50 and a source of Q6 are grounded;

pins 7 of the two paths of single-pole double-throw relays RL1 are connected to an end B of a brush direct current (DC) motor, a negative pole of D14 and capacitors C38, C39 and C47, and the other end of the capacitor C47 is grounded; an end A of the DC motor is connected to the other ends of the capacitors C38 and C39 and pins 1 and 2 of the Hall sensor U5; pins 8 of the two paths of single-pole double-throw relays RL1 are connected to a negative pole of the diode D15, a capacitor C48, and pins 3 and 4 of the Hall sensor U5; the other end of the capacitor C48 is grounded;

a pin 5 of the Hall sensor U5 is grounded, and a pin 6 of the Hall sensor U5 is connected to a resistor R54; the other end of the resistor R54 is connected to the pin 95 of the main MCU U2; a pin 7 of the Hall sensor U5 is connected to a resistor R51 and a resistor R52; the other end of the resistor R51 is connected to the pin 43 of the main MCU U2 and a capacitor C41, and the other end of the capacitor C41 is grounded; the other end of the resistor R52 is connected to the pin 9 of the monitoring MCU U1 and a capacitor C45, and the other end of the capacitor C45 is connected to the pin 5 of U5; a pin 8 of the Hall sensor U5 is connected to a resistor R53, the 5V power supply and a capacitor C40; the other end of the resistor R53 is connected to the pin 6 of the Hall sensor U5; and the other end of the capacitor C40 is grounded.

The monitoring MCU U1 of the present invention is a redundancy control core of the electronic parking brake control system. The monitoring MCU U1 can independently monitor the running state of the whole control system, warn abnormalities, and process the abnormalities according to the preset control logic. The monitoring MCU U1 can restore the main MCU U2 when the main MCU U2 is abnormal. The main MCU U2 can restore the monitoring MCU U1 when the monitoring MCU U1 is abnormal. Thus, the redundancy operations of the control system are achieved.

The design of a relay DC motor drive unit is the core of low cost of the electronic parking brake control system. The relay DC motor drive unit adopts two paths of SPDT relays to control the clockwise and anticlockwise rotations of the motor, and adopts the MOS power switch to carry out PWM switch driving, so as to drop the voltage and regulate the speed. If a duty ratio is larger, the output power of the motor is higher, so that regulation of a rotation speed and torque is achieved. The motor is connected to the Hall sensor U5 used for measuring the working current of the motor, and sends signals to the input pins of the ADCs of U1 and U2, i.e., pin 9 of U1 and pin 43 of U2, to calculate a load. The diodes are also connected to eliminate a reverse electromotive force and protect a power bus from being affected by surge attack. The controller is simple, reliable and low in cost, and is an economic brushless DC motor control and drive method, and is the core of cost policy protection.

Rationale:

After the controller is powered up, the main MCU U2 is normally powered up, checks its running alone, and sends enable to the pin 7 of the monitoring MCU U1 to enable a monitoring function. The monitoring MCU U1 mainly monitors data accesses (pins 8, 13 and 14) of the main MCU U2 and the SPI memories, inputting of external switch signals (pins 17, 18, 19 and 20), motor current signals (pin 9), and tension sensor signals (pin 10), compares them with a working state truth table pre-stored in the monitoring MCU U1, and monitors whether the working logic among the four factors meets expectation. If yes, the monitoring MCU U1 continues to keep monitoring. If no, the pin 6 drives the motor to be powered off and communicates with the main MCU U2 through the UART (pins 15 and 16) to prompt that the main MCU U2 works abnormally. The monitoring MCU U1 saves diagnosis information and prepares to enter an initial restoration state. When receiving a restoration confirm from the main MCU U2 through the UART, the monitoring MCU U1 saves its state information, and the pin 11 of the monitoring MCU U1 sends a restoration signal to the main MCU U2 to complete one round of abnormality restoration. A fault restoration program is quickly executed to ensure normal parking.

The above mentioned contents are only preferred embodiments of the present invention and are not intended to limit the present invention. Various modifications or equivalent substitutions made by those skilled in the art within the spirit and protection scope of the present invention shall fall within the protection scope of the technical solution of the present invention.

The invention claimed is:

1. An automobile electronic parking execution controller with a double-micro control unit (MCU) redundancy design, comprising:

a parking switch circuit, a biaxial acceleration sensor unit, a main MCU and a monitoring MCU, wherein the main MCU controls a parking motor by means of detecting signals of the parking switch circuit and the biaxial acceleration sensor;

the monitoring MCU monitors a running state of the automobile electronic parking execution controller, and restores the main MCU when the main MCU is abnormal;

two ends of the motor control connection directions of a positive pole and a negative pole of the motor respectively through a single-pole double-throw relay RL1 to control a clockwise or anticlockwise rotation of the motor; and the motor is driven by a pulse width modulation (PWM) switch through the MOS switch to regulate a rotation speed and torque of the motor, wherein in the monitoring MCU, a pin 3 is connected to a 5V power supply and a capacitor C98, and a pin 4 is connected to the other end of the capacitor C98 and grounded;

a pin 6 is connected to a gate of a motor drive circuit MOS switch Q12 and sends a motor drive control signal;

the pin 9 is connected to the Hall sensor U5 used for measuring a working current of the motor, and is used for determining whether the motor is in a normal working state; if the current is overloaded, a signal is sent out through the pin 6 to control the running of the motor, and wherein in the main MCU, a pin 84 is connected to a 5V power supply and a capacitor C101, and a pin 83 is connected to the other end of the capacitor C101 and grounded;

pins 12 and 13 are connected to the two paths of single-pole double-throw relays RL1 to control the clockwise and anticlockwise rotations of the motor;

a pin 10 is connected to a gate of a motor drive MOS switch Q11;

pins 43 and 95 are connected to the Hall sensor U5.

2. The automobile electronic parking execution controller with the double-MCU redundancy design according to claim 1, wherein the pin 6 of the monitoring MCU is connected to a resistor R74, and the other end of the resistor R74 is connected to a resistor R75 and the gate of the MOS switch Q12; the other end of the resistor R75 and a source of the MOS switch Q12 are grounded; a drain of the MOS switch Q12 is connected to a drain of the MOS switch Q11, a negative pole of a diode D20, a base of a triode Q9 and a resistor R69; the other end of the resistor R69 is connected to a 13V power supply;

a source of the MOS switch Q11 is grounded; the gate is connected to a resistor R72; the other end of the resistor R72 is connected to a resistor R70 and the pin 10 of the main MCU, and the other end of the resistor R70 is connected to the 5V power supply;

a collector of the triode Q9 is connected to a resistor R68, and the other end of the resistor R68 is connected to the 13V power supply; an emitter of Q9 is connected to a positive pole of the diode D20 and a resistor R71; the other end of the resistor R71 is connected to a capacitor C65, a resistor R73, a negative pole of a voltage-stabilizing diode D21 and a gate of an MOS switch Q10, and the other ends of the capacitor C65, the resistor R73 and the voltage-stabilizing diode D21 and a source of the MOS switch Q10 are grounded;

a drain of the MOS switch Q10 is connected to positive poles of a diode D14 and a diode D15 and pins 1 of the two paths of single-pole double-throw relays RL1; pins 2 of the two paths of single-pole double-throw relays RL1 are connected to the 13V power supply; pins 3 of the two paths of single-pole double-throw relays RL1 are connected to a positive pole of a diode D16 and a drain of an MOS switch Q7; a gate of the MOS switch Q7 is connected to a resistor R55 and a resistor R56; the other end of the resistor R55 is connected to the pin 13 of the main MCU; the other end of the resistor R56 and a source of the MOS switch Q7 are grounded;

pins 4 of the two paths of single-pole double-throw relays RL1 are connected to a negative pole of D16, pins 6 of the two paths of single-pole double-throw relays RL1, a negative pole of a diode D10 and the 13V power supply; pins 5 of the two paths of single-pole double-throw relays RL1 are connected to a positive pole of the diode D10 and a drain of an MOS switch Q6; a gate of the MOS switch Q6 is connected to a resistor R49 and a resistor R50; the other end of the resistor R49 is connected to the pin 12 of the main MCU; the other end of the resistor R50 and a source of Q6 are grounded;

pins 7 of the two paths of single-pole double-throw relays RL1 are connected to an end B of a brush direct current (DC) motor, a negative pole of D14 and capacitors C38, C39 and C47, and the other end of the capacitor C47 is grounded; an end A of the DC motor is connected to the other ends of the capacitors C38 and C39 and pins 1 and 2 of the Hall sensor U5; pins 8 of the two paths of single-pole double-throw relays RL1 are connected to a negative pole of the diode D15, a capacitor C48, and pins 3 and 4 of the Hall sensor U5; the other end of the capacitor C48 is grounded;

a pin 5 of the Hall sensor U5 is grounded, and a pin 6 of the Hall sensor U5 is connected to a resistor R54; the other end of the resistor R54 is connected to the pin 95 of the main MCU; a pin 7 of the Hall sensor U5 is connected to a resistor R51 and a resistor R52; the other end of the resistor R51 is connected to the pin 43 of the main MCU and a capacitor C41, and the other end of the capacitor C41 is grounded; the other end of the resistor R52 is connected to the pin 9 of the monitoring MCU and a capacitor C45, and the other end of the capacitor C45 is connected to the pin 5 of U5; a pin 8 of the Hall sensor U5 is connected to a resistor R53, the 5V power supply and a capacitor C40; the other end of the resistor R53 is connected to the pin 6 of the Hall sensor U5; and the other end of the capacitor C40 is grounded.

3. The automobile electronic parking execution controller with the double-MCU redundancy design according to claim 2, wherein in the monitoring MCU, pins 1 and 2 are respectively used for restoration inputting and program downloading signal connection of the monitoring MCU;

a pin 7 is connected to a pin 96 of the main MCU, and the main MCU sends an enable chip select signal to the monitoring MCU to enable the monitoring MCU;

pins 8, 13 and 14 input and output serial peripheral interface (SPI) signals and are connected to SPI memories, and pins 91, 92 and 93 of the main MCU are connected to SPI sensors; the SPI signals are used for monitoring whether the main MCU on an SPI bus makes an error in reading and writing an internal memory chip; if an error occurs, the main MCU is restored according to a corresponding control logic;

a pin 10 is connected to a tension sensor and used for determining whether a load driven by the motor is in a normal working state; in case of an overload, the pin 6 sends a signal to control the running of the motor to control a tension load;

a pin 11 is a restoration output to restore the main MCU;

pins 15 and 16 are respectively connected to pins 71 and 72 of the main MCU and are used for communication and interaction between the main MCU and the monitoring MCU;

pins 17, 18, 19 and 20 are used for inputting parking switch signals; after a combination state is converted by an analog-to-digital converter (AD) inside the monitoring MCU, the monitoring MCU determines whether a user initiates a clamping or releasing action according to a preset logic, and then controls the clockwise and anticlockwise rotations of the motor to drive the tension load.

4. The automobile electronic parking execution controller with the double-MCU redundancy design according to claim 1, wherein the main MCU restores the monitoring MCU when the monitoring MCU is abnormal.

5. An automobile electronic parking execution controller with a double-micro control unit (MCU) redundancy design, comprising:

a parking switch circuit, a biaxial acceleration sensor unit, a main MCU and a monitoring MCU, wherein the main MCU controls a parking motor by means of detecting signals of the parking switch circuit and the biaxial acceleration sensor;

the monitoring MCU monitors a running state of the automobile electronic parking execution controller, and restores the main MCU when the main MCU is abnormal;

a pin 3 is connected to a 5V power supply and a capacitor C98, and a pin 4 is connected to the other end of the capacitor C98 and grounded;

a pin 6 is connected to a gate of a motor drive circuit MOS switch Q12 and sends a motor drive control signal;

a pin 9 is connected to a Hall sensor U5 used for measuring a working current of the motor, and is used for determining whether the motor is in a normal working state; if the current is overloaded, a signal is sent out through the pin 6 to control the running of the motor;

two ends of the motor control connection directions of a positive pole and a negative pole of the motor respectively through a single-pole double-throw relay RL1 to control a clockwise or anticlockwise rotation of the motor; and the motor is driven by a pulse width modulation (PWM) switch through the MOS switch to regulate a rotation speed and torque of the motor wherein in the monitoring MCU, pins 1 and 2 are respectively used for restoration inputting and program downloading signal connection of the monitoring MCU;

a pin 7 is connected to a pin 96 of the main MCU, and the main MCU sends an enable chip select signal to the monitoring MCU to enable the monitoring MCU;

pins 8, 13 and 14 input and output serial peripheral interface (SPI) signals and are connected to SPI memories, and pins 91, 92 and 93 of the main MCU are connected to SPI sensors; the SPI signals are used for monitoring whether the main MCU on an SPI bus makes an error in reading and writing an internal memory chip; if an error occurs, the main MCU is restored according to a corresponding control logic;

a pin 10 is connected to a tension sensor and used for determining whether a load driven by the motor is in a normal working state; in case of an overload, the pin 6 sends a signal to control the running of the motor to control a tension load;

a pin 11 is a restoration output to restore the main MCU;

pins 15 and 16 are respectively connected to pins 71 and 72 of the main MCU and are used for communication and interaction between the main MCU and the monitoring MCU;

pins 17, 18, 19 and 20 are used for inputting parking switch signals; after a combination state is converted by an analog-to-digital converter (AD) inside the monitoring MCU, the monitoring MCU determines whether a user initiates a clamping or releasing action according to a preset logic, and then controls the clockwise and anticlockwise rotations of the motor to drive the tension load.

\* \* \* \* \*